United States Patent [19]

Hobes et al.

[11] Patent Number: 5,183,855
[45] Date of Patent: Feb. 2, 1993

[54] GRAFT COPOLYMER BASED ON AN ULTRAHIGH-MOLECULAR-WEIGHT POLYETHYLENE AND AN ETHYLENE COPOLYMER

[75] Inventors: John Hobes, Dinslaken; Christiane Barth, Oberhausen, both of Fed. Rep. of Germany

[73] Assignee: Hoechst Aktiengesellschaft, Fed. Rep. of Germany

[21] Appl. No.: 762,607

[22] Filed: Sep. 19, 1991

[30] Foreign Application Priority Data

Sep. 27, 1990 [DE] Fed. Rep. of Germany ....... 4030565

[51] Int. Cl.$^5$ .................... C08L 23/08; C08L 23/26
[52] U.S. Cl. .................... 525/193; 525/222; 525/227; 525/285
[58] Field of Search .................... 525/193

[56] References Cited

U.S. PATENT DOCUMENTS

| | | | |
|---|---|---|---|
| 3,949,019 | 4/1976 | Zeitler et al. | 525/260 |
| 4,612,155 | 9/1986 | Wong et al. | 525/193 |
| 4,678,834 | 7/1987 | Boivin et al. | 525/193 |
| 4,927,871 | 5/1990 | Ohori et al. | 524/354 |

FOREIGN PATENT DOCUMENTS

| | | |
|---|---|---|
| 173572 | 3/1986 | European Pat. Off. . |
| 300718 | 1/1989 | European Pat. Off. . |
| 59-126446 | 7/1984 | Japan .................... 525/222 |
| 1-026607 | 1/1989 | Japan .................... 525/193 |

OTHER PUBLICATIONS

*Patent Abstracts of Japan*, vol. 11, No. 259(C-441)(2706); Aug. 21, 1987, JPA-62-50637; Mar. 16, 1987.

*Primary Examiner*—Carman J. Seccuro, Jr.
*Attorney, Agent, or Firm*—Jordan B. Bierman

[57] ABSTRACT

A graft copolymer based on ultrahigh-molecular-weight polyethylene having a molecular weight ≧ 1,000,000 g/mol, an ethylene copolymer and a graft monomer; and the preparation and use thereof. The ethylene copolymer contains ethylene and vinyl acetate or ethylene and an alkenecarboxylic acid ester. The graft monomer is an alkenecarboxylic acid or an alkenecarboxylic anhydride. The resultant graft polymers posses improved properties compared with the materials from which they are derived.

21 Claims, No Drawings

GRAFT COPOLYMER BASED ON AN ULTRAHIGH-MOLECULAR-WEIGHT POLYETHYLENE AND AN ETHYLENE COPOLYMER

The present invention relates to a graft copolymer based on ultrahigh-molecular weight polyethylene and an ethylene copolymer as the base polymer mixture and having modified and improved properties compared with the base polymers, and to the preparation and use thereof.

BACKGROUND OF THE INVENTION

There have been no lack of attempts in the past to improve the properties of various ethylene homopolymers and ethylene copolymers by adding additives and/or by means of chemical reactions.

U.S. Pat. No. 4,147,740 describes a process for the preparation of modified grafted polyethylenes in which an ethylene homopolymer is mixed with from 0.1 to 1.5% by weight, based on the ethylene homopolymer, of an unsaturated polycarboxylic anhydride, in particular maleic anhydride, and the components are reacted at from 140° C. to 210° C. as a melt in the presence of an organic peroxide having a half life of at least 60 seconds.

U.S. Pat. No. 4,506,056 relates to a process for the preparation of modified, grafted polymers with a reduced degree of crosslinking in which maleic anhydride is grafted on the one hand onto an ethylene homopolymer as the base polymer and on the other hand onto an ethylene vinyl acetate copolymer as the base polymer. The reaction is carried out in the presence of a free radical-forming initiator and an additive which suppresses the homopolymerization of maleic anhydride.

Neither U.S. Pat. No. 4,147,740 nor U.S. Pat. No. 4,506,056 gives any indication of the use of ultrahigh-molecular-weight polyethylene for the preparation of modified graft copolymers.

Ultrahigh-molecular-weight polyethylene means an ethylene homopolymer having a very high degree of polymerization and prepared under low-pressure synthetic conditions using Ziegler catalysts. Its molecular weight, measured viscosimetrically, is at least 1,000,000 g/mol. A number of technically important properties, such as notched impact strength, heat resistance, tear strength at elevated temperature, and wear resistance, improve with increasing molecular weight. This combination of features allows ultrahigh-molecular-weight polyethylene to be used in areas where high demands are made of the material used with respect to stress-and load-bearing capacity, not only at high temperatures, but also at low temperatures. However, the lack of adhesive strength of ultrahigh-molecular-weight polyethylene proves to be disadvantageous in the surface coating of moldings.

The ethylene copolymers present in the base polymer mixture are copolymers containing from 10% to 50% by weight of vinyl acetate or from 10% to 50% by weight of methyl acrylate in addition to ethylene and having a melt flow index MFI (190/2.16) of from 0.5 to 50 g/10 min. They are distinguished by properties such as adhesive power or toughness, in particular by an adhesive strength which makes them suitable for a number of applications, for example as adhesion promoters, binders and adhesives. However, they are still in need of improvement with respect to melt flow index and adhesive strength.

There is thus a demand for a substance which has, on the one hand, essentially the properties of ethylene-vinyl acetate copolymers or ethylene-methyl methacrylate copolymers and, on the other hand, has mechanical properties, for example, abrasion resistance and reduced melt flow index, which are improved compared with these copolymers and, at the same time, has increased adhesion and can be prepared in a technically simple way.

DESCRIPTION OF THE INVENTION

This object is achieved by a graft copolymer containing 5 to 50 parts by weight of polyethylene having a molecular weight $\geq 1,000,000$ g/mol as Base Polymer I, 95 to 50 parts by weight of a copolymer comprising 10% to 50% by weight of vinyl acetate or alkenecarboxylic acid ester and 50% to 90% by weight of ethylene as Base Polymer II, and 0.5 to 3.0 parts by weight of alkenecarboxylic acid or alkenecarboxylic anhydride as a graft monomer.

The mixture of Base Polymers I and II which is present in the graft copolymer according to the invention comprises, as a consequence of the preparation method, a mixture of crosslinked and uncrosslinked Base Polymers, onto which the alkenecarboxylic acid or its anhydride is grafted. The degree of crosslinking of the Base Polymers, i.e. the percentage of crosslinked Base Polymers, is from 5% to 45%, in particular from 10% to 40%, based on the total amount of Base Polymers I and II.

Base Polymer I is a commercially available ultrahigh-molecular-weight polyethylene having a molecular weight of 1,000,000 to 10,000,000, preferably 2,000,000 to 8,500,000, most preferably 3,000,000 to 8,000,000 g/mol. It is used in finely divided form, e.g. as granules or powders.

Base Polymer II contains, in addition to ethylene, either vinyl acetate or, as alkenecarboxylic acid ester. The ester is derived from an alkenecarboxylic acid having 3 to 12, preferably 3 to 8, most preferably 3 to 6, carbon atoms and an aliphatic alcohol having 1 to 16, preferably 1 to 12, most preferably 1 to 8, carbon atoms. Particularly suitable alkenecarboxylic acid esters are methyl acrylate, ethyl acrylate, n-butyl acrylate, and tert.-butyl acrylate. Methyl acrylate has been found most useful.

The preferred graft copolymer contains 10 to 45 parts by weight of ultrahigh-molecular-weight polyethylene having a molecular weight $\geq 1,000,000$ g/mol (Base Polymer I), 90 to 55 parts by weight of Base Polymer II, and 1.0 to 2.0 parts by weight of alkenecarboxylic acid or its anhydride as a graft monomer.

The properties of the graft copolymer can be modified without difficulty within certain limits in a specific manner either by varying the proportion of ultrahigh-molecular-weight polyethylene and/or via the molecular weight of the ultrahigh-molecular-weight polyethylene employed. If the proportion or molecular weight of the ultrahigh-molecular weight polyethylene is increased, the melt flow index and toughness also increases; conversely, a reduction in the two parameters results in decreases in the melt flow index and the toughness.

Alkenecarboxylic acids (graft monomers) which are advantageously used are maleic acid, fumaric acid, itaconic acid, crotonic acid, acrylic acid and methacrylic acid, especially acrylic acid. Alkenecarboxylic anhydrides (graft monomers) which are advantageously used are acrylic anhydride, itaconic anhydride, crotonic anhydride, and maleic anhydride. A particularly suitable graft monomer is maleic anhydride.

The graft copolymer according to the invention has better adhesive strength than either Base Polymer I, which has no adhesive power, or Base Polymer II and the corresponding grafted copolymer. The adhesive strength is a consequence of the alkenecarboxylic acid or alkenecarboxylic anhydride groups introduced by grafting on to the Base Polymers I and II. As the number of these reactive groups increases, the adhesive strength, measured as peel strength, also increases.

Of the various possibilities of stressing an adhesive bond, i.e. tension, impact, and peeling, it is primarily the last that is employed to assess the adhesion behavior and thus to assess the adhesive strength. The peel strength is defined as the force required to peel off a certain strip from a polyethylene covering over a defined peeling path. It indicates the force per tear length which is required to break the bond. A distinction is made between initial tear force and tear propagation force. The latter is of primary importance for the adhesive strength of a system. The component to be bonded is aluminum sheeting to which the ultrahigh-molecular-weight polyethylene is applied.

The peel strength is determined using a Zwick tensile testing machine (vertical design) in whose jaws the areas ($30 \times 100$ mm$^2$) of the bonded system are clamped at an angle of 90°. The actual adhesive area ($70 \times 100$ mm$^2$) is perpendicular to the clamping jaws. The peel rate is 50 mm/min. The tear or peel forces which occur are recorded by means of a plotter.

The peel strength is at a maximum, for example at from 12 to 22N, for values of from 0.5 to 3.0 parts by weight of alkenecarboxylic acid or alkenecarboxylic anhydride, in each case based on 100 parts by weight of Base Polymers I and II.

The copolymers used as base polymer II are prepared by reacting the monomer mixtures, containing appropriate amounts of vinyl acetate or alkenecarboxylic acid ester in addition to ethylene, at a pressure of 50 to 350 MPa, preferably 100 to 300 MPa, most preferably 125 to 275 MPa. The useful temperatures are 100° C. to 350° C., preferably 120° C. to 325° C., most preferably 130° C. to 300° C., in the presence of oxygen or free radical-forming compounds.

As polymerization initiators, oxygen or free radical-forming compounds are employed. The free radical-forming compounds include organic peroxides, hydroperoxides, and azo compounds. Peroxides from the classes comprising the diacyl peroxides, peroxydicarbonates, alkyl peresters, perketals, dialkyl peroxides, ketone peroxides, and alkyl hydroperoxides have proven successful.

The free-radical forming compounds can be used alone or in mixtures. Polymerization initiators are employed in a concentration of 3 to 50 ppm by weight, preferably 5 to 40 ppm by weight, most preferably 10 to 25 ppm by weight, based on ethylene. They are introduced into the polymerization directly or as a solution in an organic solvent. Suitable solvents are hydrocarbons, such as isooctane, benzene, toluene, or petroleum ether fractions. The residence time of the monomer mixture in the polymerization step is 30 to 180 seconds, preferably 50 to 160 seconds, most preferably 60 to 140 seconds.

The reaction can be carried out in high-pressure reactors known for the polymerization of ethylene and ethylene-containing monomer mixtures. These include autoclaves equipped with slurries and tubular reactors (cf. Ullmanns Encyclopadie der Technischen Chemie {Ullmann's Encyclopedia of Industrial Chemistry}, 4th Edition, Verlag Chemie Weinheim-Basle, 1980, Volume 19, pages 169, 172 and 175). If a tubular reactor is used, the entire monomer mixture including the initiators can be fed to the reactor in one stream. However, it is particularly advantageous to use a tubular reactor with the subsequent metering of cold gas and initiator and to divide the monomer mixture into at least two substreams. In this case, one substream is fed to the reactor inlet and further substreams are introduced into the reaction zone along the reactor, usually in the region of the peak temperature.

The above-mentioned polymerization initiators may, if desired, be replaced by catalysts comprising an organometallic compound of an element from Group III of the Periodic Table of the Elements [IUPAC Version] and a titanium compound (Ziegler catalysts).

If desired, the reaction can also be carried out in the presence of separate molecular weight regulators (moderators). Molecular weight regulators are compounds which are added to the monomers in various concentrations in order to moderate the growth of the polymeric molecule and thus to limit the molecular weight of the polymer. Molecular weight regulators include representatives from a very wide variety of classes of substances. Examples which may be mentioned are hydrogen, alkanes, unbranched alpha-olefins, alcohols, aldehydes, and ketones (cf. Fortschr. Hochpolym.-Forschg. 7(3), 386–448).

The present invention furthermore relates to a process for the preparation of the graft copolymer in which th polyethylene having a molecular weight $\geq 1,000,000$ g/mol (Base Polymer I), the copolymer comprising vinyl acetate or alkenecarboxylic acid ester and ethylene (Base Polymer II), and the alkenecarboxylic acid or its anhydride are mixed with one another and reacted at elevated temperature and, if desired, elevated pressure in the presence of free radical-forming initiators.

The process is carried out at temperatures of 160° C. to 240° C., preferably 170° C. to 230° C., most preferably 180° C. to 220° C. Useful pressures are 0.1 to 2.0 MPa, preferably 0.15 to 1.5 MPa, most preferably 0.3 to 1.0 MPa.

Free radical-forming initiators which have proven successful are organic peroxides and hydroperoxides. Particular emphasis should be placed on diacyl peroxides, peroxydicarbonates, alkyl peresters, perketals, dialkyl peroxides, ketone peroxides, and alkyl hydroperoxides. Particularly suitable initiators are 2,5-dimethyl-2,5-bis(tert.-butylperoxy)hexane,3,3,6,6,9,9-hexamethyl-1,2,4,5-tetraoxacyclononane, and 1,1-bis(-tert.-butylperoxy) cyclohexane; in particular, 2,5-dimethyl-2,5-bis(tert.-butylperoxy)hexane is most advantageous.

In a preferred process variant, the graft monomers, namely alkenecarboxylic acid or its anhyride, together with the free radical-forming initiators (dissolved in a suitable solvent) are added to the mixture of the two Base Polymers. The mixture is subsequently stirred vigorously, and the solvent is then removed by evaporation.

To prepare the solution containing the alkenecarboxylic acid or its anhydride and the free radical-forming initiator, polar organic solvents having a relatively low boiling point, for example aliphatic ketones having 3 to 5 carbon atoms, aliphatic esters, cyclic ethers, such as tetrahydrofuran or dioxane, are suitable. It has proven particularly successful to use acetone, methyl isobutyl ketone, propylene carbonate, formamide, acrylic acid esters, and ethyl acetate. Most desirably, acetone or ethyl acetate is used as the solvent.

This impregnation process ensures extremely uniform distribution both of the alkenecarboxylic acid or alkenecarboxylic anhydride and of the free radical-forming initiator on the Base Polymers I and II. The further processing can take place in a particularly simple manner using a twin-screw extruder at the above-mentioned temperatures and pressures. It is best that sufficient time is available for the mixture to be fully plasticized and for a very homogeneous graft copolymer to be produced. The reaction time (residence time in the extruder) is usefully 0.2 to 10 minutes, preferably 0.3 to 6 minutes, most preferably from 0.5 to 4 minutes.

During processing of ultrahigh-molecular-weight polyethylene, it is usually ensured that no shear forces, which result in uncontrolled degradation of the ultrahigh-molecular-weight polyethylene, act on the material to be plasticized. Against this background, it is surprising that the graft copolymer according to the invention can be produced in a technically simple manner, without disadvantages, by means of a twin-screw extruder which allows strong shear forces to act on the starting materials. It may be that the copolymer used as Base Polymer II acts on the ultrahigh-molecular-weight polyethylene employed, to a certain extent, as an internal plasticizer.

As a consequence of the reaction initiated by the free radicals liberated, not only is the alkenecarboxylic acid or corresponding anhydride grafted onto Base Polymer I and II, but partial crosslinking of the mixture of the two Base Polymers also takes place. The degree of crosslinking is, as stated above, from 5 to 45%. It is no longer possible to measure the molecular weight of the crosslinked mixture of Base Polymers I and II by conventional measurement methods. The degree of crosslinking depends on the amount of free radical-forming initiator employed. Increasing amounts of initiator cause an increase in the degree of crosslinking, while a reduction in the amount of initiator leads to a decrease in the degree of crosslinking.

In order to ensure that the alkenecarboxylic acid or anhydride is incorporated as fully as possible into the graft polymer, a specific amount of the free radical-forming initiator is necessary. Based on alkenecarboxylic acid or anhydride, 1% to 20% by weight, preferably 3% to 15% by weight, most preferably 6% to 12% by weight, of free radical-forming initiator is employed.

The examples described below illustrate the invention without limiting it.

EXAMPLES 1 TO 5

The Base Polymer I used is an ultrahigh-molecular-weight polyethylene which is characterized by the following physical properties:

The density of the homogeneously pressed material, measured in accordance with DIN 53 479, is 0.93 g/cm$^3$; the viscosity number, measured in accordance with DIN 53 728 at 135° C. (concentration in decahydronaphthalene 0.0003 g/cm$^3$); is 2,300 ml/g; the mean molecular weight (computed from the Margolies equation $M = 5.37 \times 10^4 \{\eta\}^{1.49}$), is $4.4 \times 10^6$ g/mol; but the melt flow index MFI (190/21.6) in g/10 min, determined in accordance with DIN 53 735, cannot be measured.

The Base Polymer II is one of three copolymers (A), (B), and (C):
an ethylene-vinyl acetate copolymer (A) containing 30% by weight of vinyl acetate in addition to ethylene and having a melt flow index MFI (190/2.16) OF 20 g/10 min,
an ethylene-vinyl acetate copolymer (B) containing 35% by weight of vinyl acetate in addition to ethylene and having a melt flow index MFI (190/2.16) of 35 g/10 min, and an ethylene-methyl acrylate copolymer (C) containing 34% by weight of methyl acrylate in addition to ethylene and having a melt flow index MFI (190/2.16) of 20 g/10 min.

Base Polymer I and Base Polymer II are mixed in the desired ratio. The graft monomer and free-radical-forming initiator (peroxide) are added to the mixture of Base Polymers I and II in the form of a solution with an acetone: (maleic anhydride + peroxide) weight ratio of 2:1, the components are mixed thoroughly using a tumble mixer, and the acetone is removed by evaporation.

The maleic anhydride- and peroxide-impregnated mixture of the Base Polymers I and II is subsequently processed using a twin-screw extruder (ZK 50×15 D (screw length x diameter)) with heating to 220° C. The residence time of the material to be processed in the extruder mold is from 30 to 300 seconds. The results are given in the table below in addition to further data.

Comparative Experiments a to c

The procedure is as in Examples 1 to 5 above, but the ultrahigh-molecular-weight polyethylene (Base Polymer I) is omitted, and only Base Polymer II is treated with the solution with an acetone: (maleic anhydride + peroxide) weight ratio of 2:1, the components are mixed thoroughly using a tumble mixer, and the acetone is removed by evaporation.

The maleic anhydride- and peroxide-impregnated Base Polymer II is subsequently processed using the twin-screw extruder ((ZK 50×15 D (screw length x diameter)) with heating to 220° C. The residence time of the material to be processed in the extruder mold is from 30 to 300 seconds.

The results are given in the following Table in addition to further data.

| Exam-ple | Starting materials | | | | Graft Polymer | |
|---|---|---|---|---|---|---|
| | I* | II* | MAA[1)] | Peroxide[2)] | MFI (190/2.16) | Peel Strength (N) |
| 1 | 10 | 90(A) | 1.0 | 0.1 | 3.3 | 19.2 |
| 2 | 20 | 80(A) | 1.0 | 0.1 | 2.1 | 18.8 |
| 3 | 30 | 70(A) | 1.0 | 0.1 | 0.2 | 13.3 |
| a | — | 100(A) | 1.0 | 0.1 | — | 8.3 |
| 4 | 40 | 60(B) | 1.0 | 0.1 | 0.2 | 12.0 |
| b | — | 100(B) | 1.0 | 0.1 | — | 6.8 |
| 5 | 20 | 80(C) | 1.0 | 0.1 | 2.9 | 21.6 |
| c | — | 100(C) | 1.0 | 0.1 | — | 11.6 |

I* = parts by weight of Base Polymer I
II* = parts by weight of (A), (B), or (C) (Base Polymer II)
[1)]MAA = parts by weight of maleic anhydride
[2)]parts by weight of 2,5-dimethyl-2,5-bis(tert.-butylperoxy)hexane.

While only a limited number of specific embodiments of the present invention have been expressly disclosed, it is, nonetheless, to be broadly construed and not to be limited except by the character of the claims appended hereto.

What we claim is:

1. A graft copolymer containing from 5 to 50 parts by weight of polyethylene having a molecular weight of at least 1,000,000 g/mol and constituting Base Polymer I; 95 to 50 parts by weight of a Base Polymer II comprising 10% to 50% by weight of vinyl acetate or alkenecarboxylic acid ester and 50% to 90% by weight of ethylene; and 0.5 to 3.0 parts by weight of alkenecarboxylic acid or alkenecarboxylic anhydride per 100 parts of Base Polymers I and II, as a graft monomer.

2. The graft copolymer of claim 1 wherein said alkenecarboxylic acid ester is derived from an alkenecarboxylic acid having 3 to 12 carbon atoms and an aliphatic alcohol having 1 to 16 carbon atoms.

3. The graft copolymer of claim 2 wherein said alkenecarboxylic acid has 3 to 8 carbon atoms and said aliphatic alcohol has 1 to 12 carbon atoms.

4. The graft copolymer of claim 2 wherein said alkenecarboxylic acid has 3 to 6 carbon atoms and said aliphatic alcohol has 1 to 8 carbon atoms.

5. The graft copolymer of claim 1 comprising 10 to 45 parts by weight of said Base Polymer I, 90 to 55 parts by weight of said Base Polymer II, and 1.0 to 2.0 parts by weight of said graft monomer.

6. The graft copolymer of claim 1 wherein said graft monomer is selected from the group consisting of maleic acid, fumaric acid, itaconic acid, crotonic acid, acrylic acid, methacrylic acid, maleic anhydride, itaconic anhydride, crotonic anhydride, acrylic anhydride.

7. The graft copolymer of claim 6 wherein said graft monomer is acrylic acid.

8. The graft copolymer of claim 6 wherein said graft monomer is maleic anhydride.

9. The graft copolymer of claim 1 wherein said Base Polymer I has a molecular weight of 1,000,000 to 10,000,000 g/mol.

10. The graft copolymer of claim 9 wherein said molecular weight is 2,000,000 to 8,500,000 g/mol.

11. The graft copolymer of claim 1 wherein there is 5% to 45% crosslinking based on said Base Polymers I and II.

12. A process for the preparation of the graft copolymer of claim 1 comprising mixing said Base Polymer I, said Base Polymer II, said graft monomer, and a free-radical forming initiator to form a reaction mixture, reacting said mixture at elevated temperature and at least atmospheric pressure.

13. The process of claim 12 wherein said temperature is 160° C. to 240° C., said pressure is 0.1 to 2.0 MPa.

14. The process of claim 13 wherein said temperature is 170° C. to 230° C.

15. The process of claim 12 wherein said initiator is selected from the group consisting of organic peroxides and hydroperoxides.

16. The process of claim 15 wherein said peroxides are selected from the group consisting of diacyl peroxides, peroxydicarbonates, alkyl peresters, perketals, dialkylperoxides, ketone peroxides and alkyl hydroperoxides.

17. The process of claim 16 wherein said initiator is selected from the group consisting of 2,5-dimethyl-2,5-bis(tert.butyl peroxy)hexane, 3,3,6,6,9,9-hexamethyl-1,2,4,5-tetraoxacyclononane, and 1,1-bis(tert.butylperoxy)cyclohexane.

18. The process of claim 17 wherein said initiator is 2,5-dimethyl-2,5-bis(tert.butylperoxy)hexane.

19. The process of claim 12 wherein said initiator is present in an initiating amount of 1% to 20% by weight based on said graft monomer.

20. The process of claim 19 wherein said initiating amount is 3% to 15% by weight based on said graft monomer.

21. A process for the preparation of the graft copolymer of claim 1 wherein said graft monomer and said initiator are dissolved in a solvent to form a solution, said solution is added to said Base Polymers I and II, mixing said solution and said Base Polymers I and II to form a reaction blend, reacting said blend at elevated temperature and at least atmospheric pressure.

* * * * *